C. E. STARR.
DRIVING MECHANISM FOR MOTOR VEHICLES.
APPLICATION FILED AUG. 9, 1919.
1,362,361.
Patented Dec. 14, 1920.
2 SHEETS—SHEET 2.
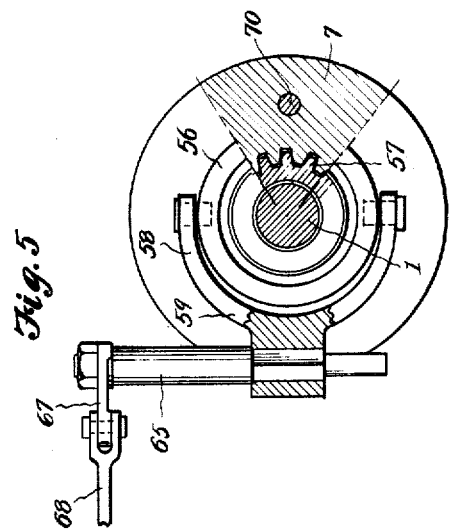
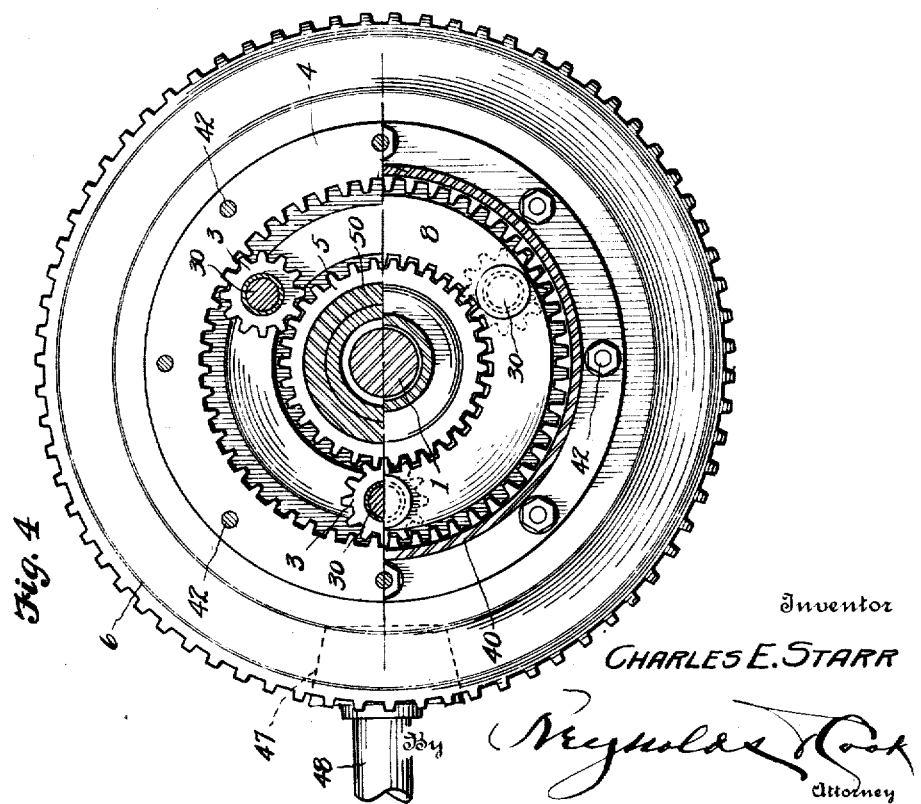
Inventor
CHARLES E. STARR

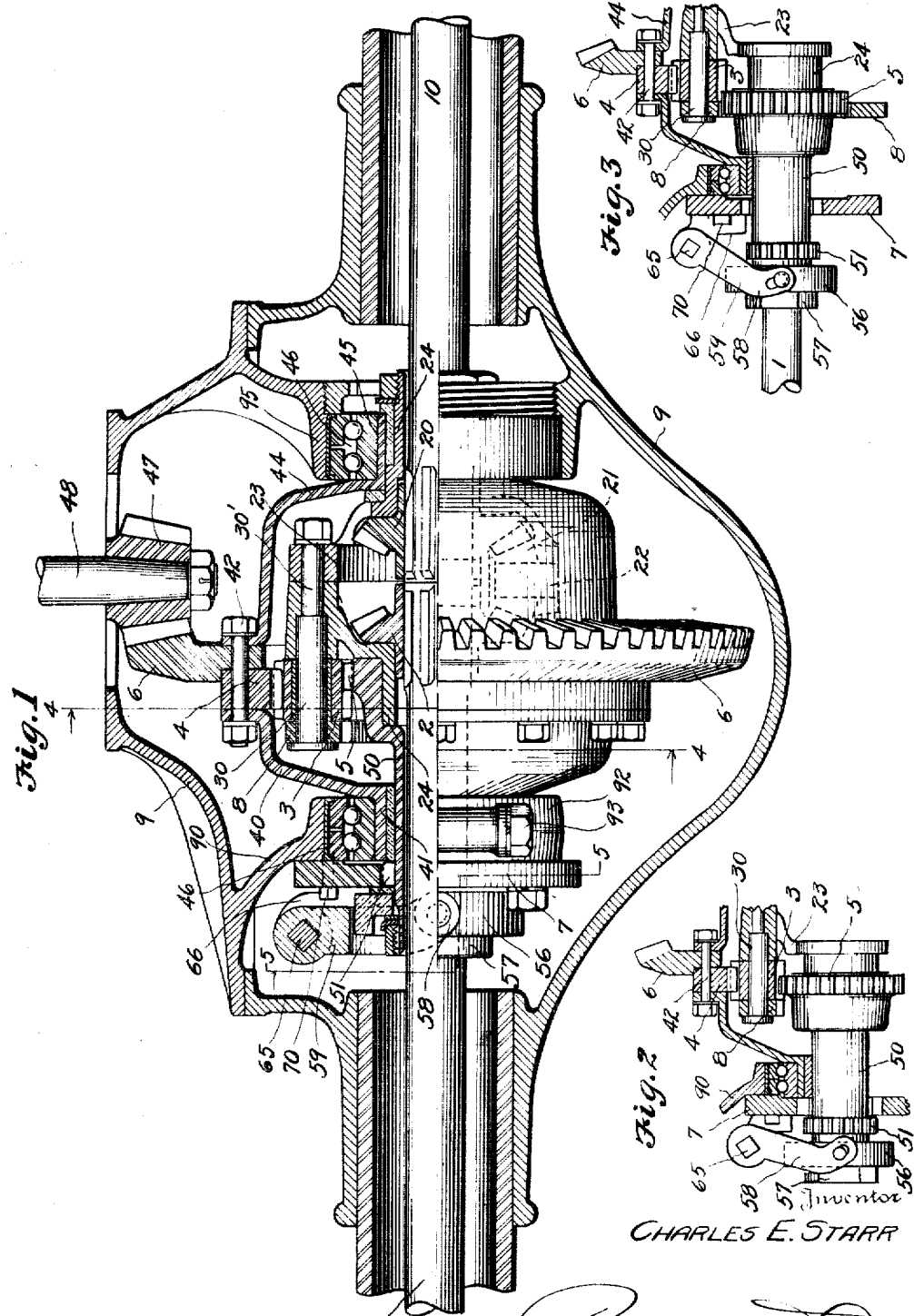

UNITED STATES PATENT OFFICE.

CHARLES E. STARR, OF SEDRO WOOLLEY, WASHINGTON.

DRIVING MECHANISM FOR MOTOR-VEHICLES.

1,362,361.   Specification of Letters Patent.   Patented Dec. 14, 1920.

Application filed August 9, 1919. Serial No. 316,403.

*To all whom it may concern:*

Be it known that I, CHARLES E. STARR, a citizen of the United States, and resident of the city of Sedro Woolley, county of Skagit, State of Washington, have invented certain new and useful Improvements in Driving Mechanism for Motor-Vehicles, of which the following is a specification.

My invention relates to speed changing mechanism and more particularly to the combination of a differential and planetary gear system whereby a change of speed of parts driven thereby may be secured by the shifting of certain parts of the mechanism to permit or prevent movement of the planetary system.

The object of the invention is to combine a planetary gear system with a differential mechanism as is ordinarily used for the purpose of driving of automobiles in a construction that is simple, compact and efficient.

In accomplishing this object I have provided improved details of construction, the preferred forms of which are illustrated in the accompanying drawings, wherein—

Figure 1 is a longitudinal section through the differential housing on the plane of the driving shaft and axles; the forward portion of the gearing members being shown in section while the remaining parts are shown in plan.

Fig. 2 is a view, partly in section, showing the relative positions of the movable locking member and coöperating parts when the former is in a neutral position.

Fig. 3 is a similar view of the same parts in such relation as to produce a direct drive or what may be termed a high speed.

Fig. 4 is a transverse vertical section taken substantially on the line 4—4 of Fig. 1.

Fig. 5 is a transverse vertical section substantially on the broken line 5—5 in Fig. 1.

Referring more in detail to the drawings—

1 and 10 represent the inner ends of differential shafts which may comprise the shafts of an automobile rear axle. These shafts have their ends abutting and are connected and driven by a differential mechanism which is, or may be, of a standard construction. As here shown the differential mechanism consists of two opposedly mounted bevel gears 2 and 20 which are keyed, preferably by a spline connection, respectively on the abutting ends of the shafts 1 and 10, and intermediate bevel gears 21, which are mounted on shafts 22 carried by a frame 23 and mesh simultaneously with the gears 2–20.

The frame 23 comprises two similar sections, each having a peripheral member which coöperates with the other like member to form a mounting for the shafts 22 and having bearing sleeves 24 whereby the frame is supported; the sleeves being revoluble about the shafts adjacent the outer sides of the gears 2–20 which retain the frame in position against longitudinal shifting.

Extending laterally from the frame is a series of journal pins 30 upon which pinions 3 are mounted; the pinions being the intermediate gears of a planetary gear system. As shown best in Fig. 4 three of these gears are shown although the number may be varied if desired or as is necessary. The inner ends 30' of these pins are extended through the two sections of the frame 23 and are provided at their ends with nuts whereby the two sections are locked securely together to form a rigid frame.

4 designates the master gear of the planetary system and 6 the master gear of the whole system; the two gears being secured together and also to supporting webs 40 and 44 by means of bolts 42. The webs 40 and 44 are respectively provided with sleeves 41 and 45 upon which they turn and the webs may either form a closed housing for the differential gears or may be an open work spider; the sleeves being revolubly supported within suitable anti-friction bearings, as shown at 46, which are mounted in the differential housing as later described.

The inner gear 5 of the planetary system is formed integral with and at one end of a longitudinally shiftable sleeve 50, which is adapted to turn freely upon the axle 1 and has a somewhat enlarged portion whereon the gear 5 is formed which revolves freely about the bearing sleeve 24 of the frame 23.

Power to drive the axles 1 and 10 is communicated through the master gears 5 and 4 and is applied to the gear 5. The manner of doing this as here shown consists of a gear 47 carried by a power transmission shaft 48 that may be operated by any suitable source of power.

The smaller end of the sleeve 50 is provided near its end with a gear 51, the teeth of which are adapted to be disengaged from or to mesh with those of an internally toothed ring 7, which is fixed by bolts 70 within the housing.

Mounted concentrically about the sleeve 5 on the outer ends of the pins 30 is an internally toothed ring gear 8 which is adapted to receive the gear 5 as the sleeve 50 is shifted longitudinally on its axle. In the position of the sleeve 50 and gear 5, as shown in Fig. 1, the sleeve and gear are held against rotation by the interlocking of the teeth of gear 51 with the teeth of the fixed ring 7 and consequently, when the mechanism is driven, the master gear 4 and axles are moved at different speeds; the latter being slower than the former according to the proportion or size of the gears. If, however, the sleeve is shifted so as to disengage the teeth of gear 51 and interlock the teeth of the gear 50 simultaneously with the teeth of the pinions 3 and ring gear 8, as in Fig. 3, the pinions will be held against rotation so that the casing 23 will revolve with the master gears and consequently, the axles will be driven directly from the master gear at what may be termed their high speed.

The sleeve 50 assumes a neutral driving position when it is shifted so that the gear 5 and teeth 51 are both disengaged from the locking rings, as is illustrated in Fig. 2.

The casing 9, which incloses the mechanism, has an internal supporting member 90 at one side, wherein the bearing 46 at that side is mounted and the bearing is held in position by means of a cap 92 that is removably fixed by bolts 93 to the said supporting member. This bearing revolubly retains the sleeve 41 of the web 40 and the said sleeve forms a bearing for the shiftable sleeve 50 which in turn carries the axle 1.

At its opposite side the housing 9 has an inwardly extending sleeve 95 which supports the bearings at that side similarly as on the opposite side and the bearings revolubly support the sleeves, 24 and 45 of the frame 23 and web 44.

The preferred means for shifting the sleeve 50 to obtain the change of speed, comprises a shifting collar 56 which is revolubly retained on the sleeve between the ring of teeth of gear 51 and a nut 57 that is threaded onto and locked to the end of the sleeve. Pivotally connected to the collar are the arms 58 of a yoke 59 mounted on a vertical turning shaft 65, which in turn is supported by a bracket 66 from the interior of the housing 9.

The shaft 65 extends from the housing and has a crank lever 67 thereon to which an operating shaft 68 is attached. By oscillating this latter shaft, the collar 56, and with it the sleeve 50, will be moved lengthwise so that the gear teeth thereon will be brought into engagement with, or disengaged from the teeth of the fixed member 7.

If the sleeve 50 and its attached gear 5 be positioned, as in Fig. 1, to retain it against rotation, the intermediate pinions 3 will be caused to travel around the gear 5 carrying with them the frame 23 of the differential. If the sleeve is shifted to engage parts as shown in Fig. 3, the planetary system will be locked so as to revolve as one piece with the frame 23 and at a higher speed than when the sleeve is in its former position.

It is apparent that with the parts constructed and assembled as described a compact mechanism of such character as to be reliable, and efficient, and a means of obtaining another speed ratio for driving automobiles is provided.

Having thus described my invention what I claim as new therein and desire to secure by Letters Patent is:

1. In a power transmission device in combination, a differential gear system having a differential frame journaled upon the shafts thereof, a planetary gear system having its intermediate gears mounted on said frame, a master gear for the said intermediate gears, a locking ring fixed to the differential frame, a central gear for the planetary system adapted to be engaged with the locking ring and having a sleeve longitudinally shiftable on one of the differential shafts, a locking member on the sleeve, a fixed locking member adapted to receive said sleeve locking member and means for optionally shifting the sleeve to such position as to lock the same against rotation to cause functioning of the planetary system or to such position as to interlock the central gear with the locking ring and intermediate planetary gears to lock the differential frame relative to the master gear.

2. In a power transmission device, in combination, a differential gear system having a differential frame journaled upon the shafts thereof, a planetary gear system having its intermediate gears mounted on said frame, a master gear for the planetary system, a locking ring fixed on the frame to revolve therewith adjacent said intermediate gears, a fixed locking member spaced from the locking ring, a sleeve inclosing one of the differential shafts and having a limited movement longitudinally thereof, two gears formed on said sleeve; one of said gears forming the central gear of the planetary system and is adapted to be moved by a shifting of the sleeve into interlocking relation with the locking ring to prevent rotation of the planetary gears and to lock the frame relative to the master gear, the other gear being adapted to move into and from locking relation with the fixed locking member accordingly as the sleeve is shifted to move the opposite gear from and into locking relation with the locking ring.

3. In a power transmission device, in combination, a differential frame journaled upon the shafts thereof, pintles mounted in said frame, gears mounted on said pintles forming the intermediate gears of a planetary gear system, a master gear for the intermediate gears, supporting webs secured to the master gear having bearing sleeve journaled in external bearings and inclosing the axles, an internally toothed locking ring mounted on said pintles adjacent said intermediate gears and adapted to revolve with said frame, a central gear for the planetary system having a sleeve extending therefrom slidable a limited distance on one of the differential shafts and having a locking gear thereon, a fixed locking ring adapted to receive the locking gear, a collar revolubly fixed on the sleeve, a shifting device fixed to said collar whereby the sleeve may be moved to optionally lock the sleeve against rotation by engagement of the locking gear thereon with the fixed locking ring or moved so as to free the locking ring and to interlock the central gear simultaneously with the intermediate gears and locking ring to prevent movement of the differential frame relative to the master gear for the purpose set forth.

Signed at Seattle, Washington, this 12th day of June, 1919.

CHARLES E. STARR.